US010762467B2

(12) United States Patent
Harada et al.

(10) Patent No.: US 10,762,467 B2
(45) Date of Patent: Sep. 1, 2020

(54) PLACEMENT INFORMATION REGISTRATION DEVICE, PLACEMENT INFORMATION REGISTRATION METHOD, AND PLACEMENT INFORMATION REGISTRATION PROGRAM

(71) Applicant: NEC Corporation, Tokyo (JP)

(72) Inventors: Hiroo Harada, Tokyo (JP); Ryoma Oami, Tokyo (JP); Yuusuke Konishi, Tokyo (JP); Hiroo Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 416 days.

(21) Appl. No.: 14/419,962

(22) PCT Filed: Jun. 28, 2013

(86) PCT No.: PCT/JP2013/067825
§ 371 (c)(1),
(2) Date: Feb. 6, 2015

(87) PCT Pub. No.: WO2014/024599
PCT Pub. Date: Feb. 13, 2014

(65) Prior Publication Data
US 2015/0213400 A1  Jul. 30, 2015

(30) Foreign Application Priority Data

Aug. 6, 2012  (JP) ................................ 2012-173984

(51) Int. Cl.
*G06Q 30/02* (2012.01)
*H01Q 1/22* (2006.01)
(Continued)

(52) U.S. Cl.
CPC ........... *G06Q 10/087* (2013.01); *G06Q 10/08* (2013.01); *G06Q 30/0202* (2013.01); *G06Q 50/28* (2013.01); *H01Q 1/2225* (2013.01)

(58) Field of Classification Search
USPC .......................................................... 705/28
See application file for complete search history.

(56) References Cited

U.S. PATENT DOCUMENTS 6,618,683 B1 * 9/2003 Berstis ................ G01C 21/165
340/10.1
7,358,857 B1 * 4/2008 White ................... G01S 5/0018
235/435
(Continued)

FOREIGN PATENT DOCUMENTS

JP  2001-225915  8/2001
JP  2006-221541  8/2006
(Continued)

OTHER PUBLICATIONS

Takahiro Mitome, "Chiri Kukan Joho o Katsuyo shita Shakai Solution", Hitachi Hyoron, vol. 90, No. 12, pp. 30-35, Dec. 2008.
(Continued)

*Primary Examiner* — Luna Champagne
(74) *Attorney, Agent, or Firm* — Finnegan, Henderson, Farabow, Garrett & Dunner, L.L.P.

(57) ABSTRACT

Provided is an art of registration and management of the placement positions of objects to be managed can be easily and reliably performed. A device includes an identification information receiving unit 11 that receives identification information that can identify an object to be managed and acquisition time of the identification information; a position information receiving unit 12 that receives position information relating to a position of a person who moves around in a target floor while carrying equipment configured to acquire the identification information; and a placement information registration unit 13 that registers the placement information of the object to be managed by registering the position information received by the unit 12 at the same time or almost at the same time as the acquisition time of the (Continued)

identification information that is received by the unit 11 in association with the identification information.

13 Claims, 3 Drawing Sheets

(51) Int. Cl.
  *G06Q 10/08* (2012.01)
  *G06Q 50/28* (2012.01)

(56) References Cited

U.S. PATENT DOCUMENTS

| | | | |
|---|---|---|---|
| 7,852,217 B2* | 12/2010 | Kondo | G01S 13/04 340/572.1 |
| 2007/0247321 A1* | 10/2007 | Okamoto | G06Q 10/08 340/573.1 |
| 2008/0046345 A1* | 2/2008 | Serre | G06Q 10/087 705/28 |
| 2008/0164997 A1* | 7/2008 | Aritsuka | G01S 5/0009 340/539.13 |
| 2009/0187424 A1* | 7/2009 | Grabowski | G16H 40/20 705/3 |
| 2010/0134611 A1* | 6/2010 | Naruoka | G06K 9/00 348/77 |
| 2010/0225470 A1* | 9/2010 | Marwah | G06Q 10/06 340/539.13 |
| 2011/0200226 A1 | 8/2011 | Takahata et al. | |
| 2012/0112904 A1* | 5/2012 | Nagy | G06Q 10/08 340/539.13 |

FOREIGN PATENT DOCUMENTS

| | | | |
|---|---|---|---|
| JP | 2006221541 A | * | 8/2006 |
| JP | 2008015577 A | * | 1/2008 |
| JP | 2010-33457 | | 2/2010 |
| JP | 2011-170565 | | 9/2011 |

OTHER PUBLICATIONS

International Search Report and Written Opinion dated Sep. 24, 2013 in corresponding PCT International Application.

\* cited by examiner

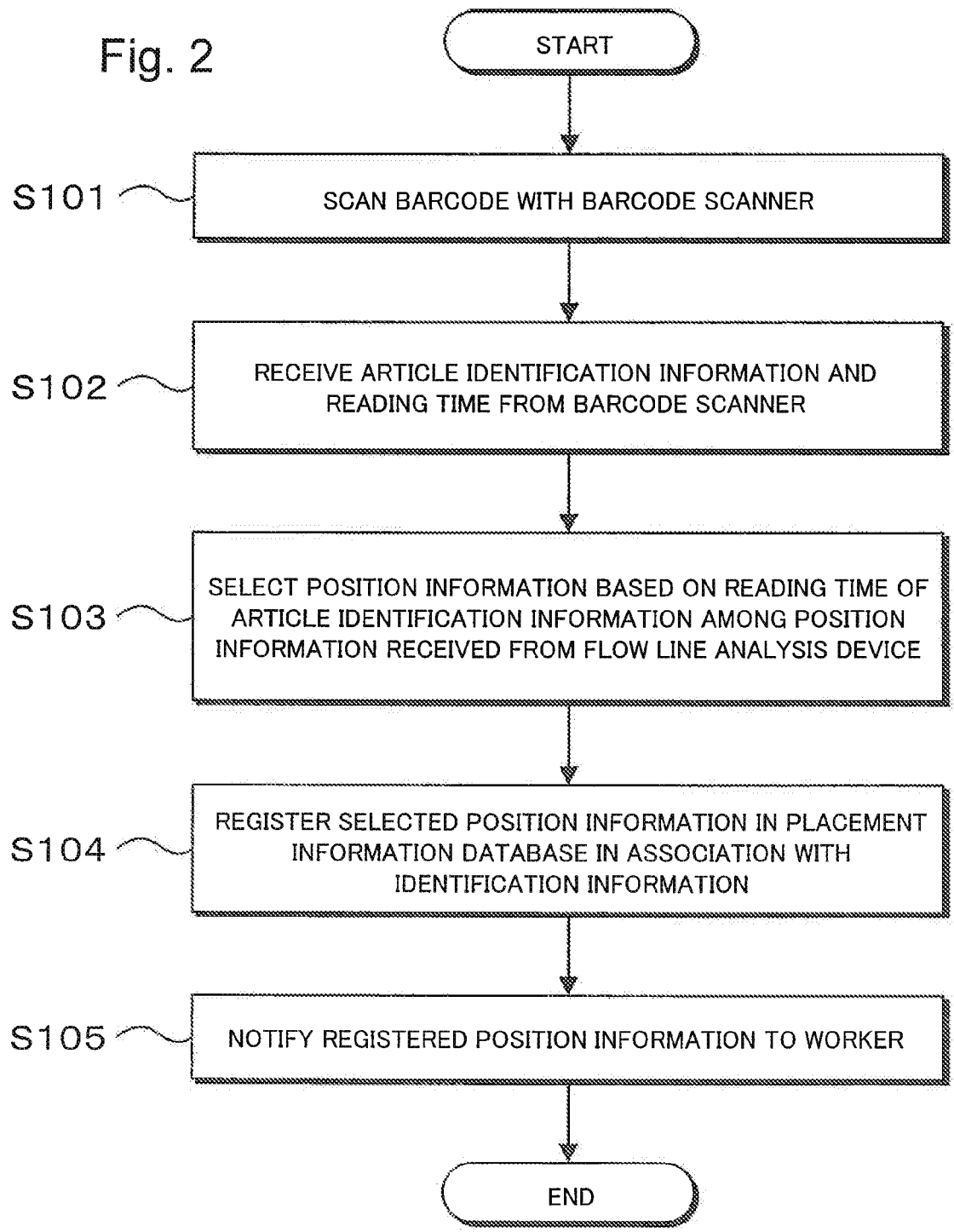

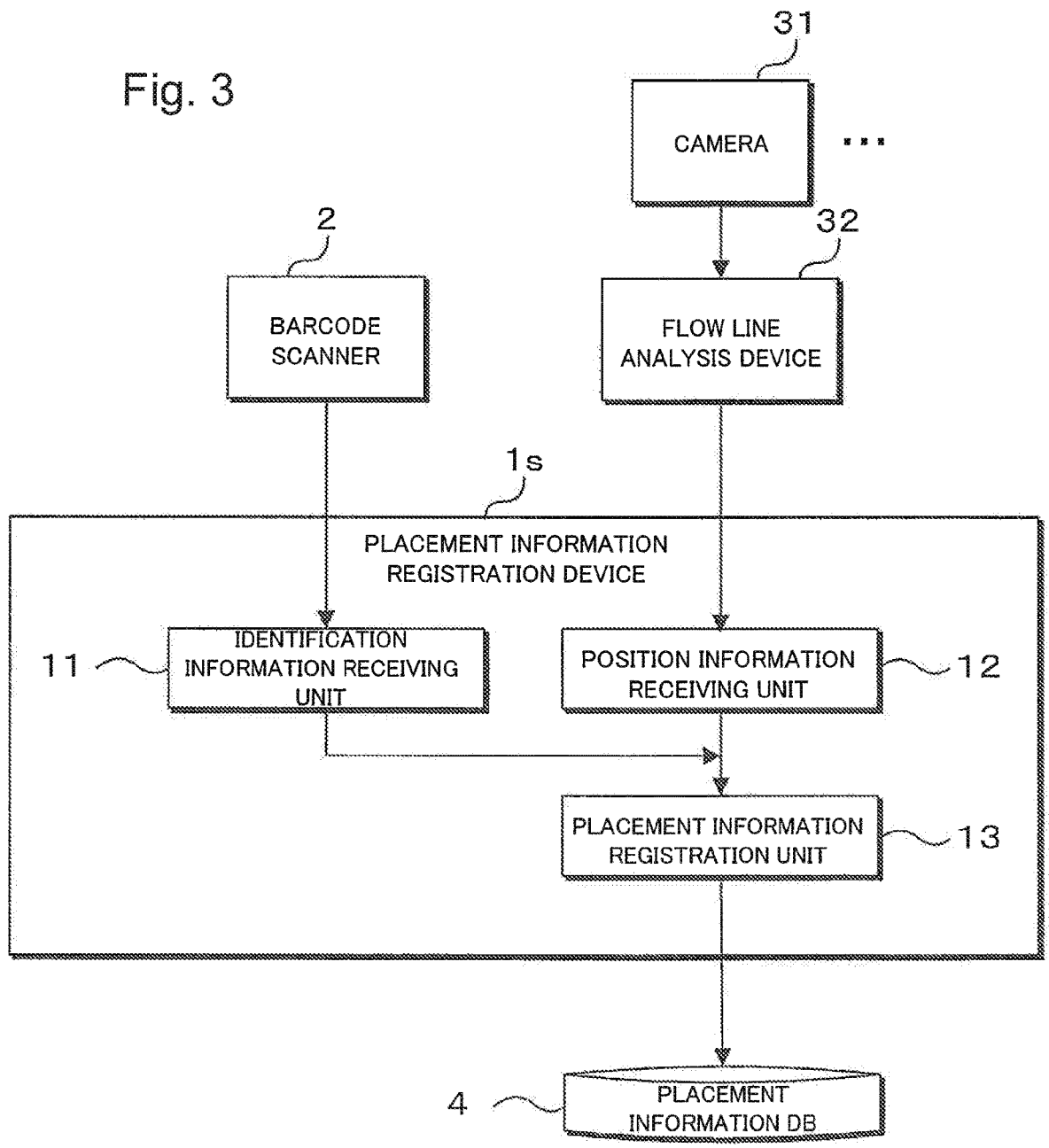

PLACEMENT INFORMATION REGISTRATION DEVICE, PLACEMENT INFORMATION REGISTRATION METHOD, AND PLACEMENT INFORMATION REGISTRATION PROGRAM

CROSS-REFERENCE TO RELATED PATENT APPLICATIONS

This application is a National Stage Entry of International Application No. PCT/JP2013/067825, filed Jun. 28, 2013, which claims priority from Japanese Patent Application No. 2012-173984, filed Aug. 6, 2012. The entire contents of the above-referenced applications are expressly incorporated herein by reference.

TECHNICAL FIELD

The present invention relates to a placement information registration device, a placement information registration method and a placement information registration program.

BACKGROUND ART

The following PTL1 discloses a technique for generating associated data that associates flow line data that represents a locus along which a customer moved with transaction data that represents the purchase contents of the customer, and collecting behavior of the customer by using the associated data. In this technique, when associating the flow line data and the transaction data, the face image of the customer is used for linking the data.

CITATION LIST

Patent Literature

[PTL 1] Japanese Unexamined Patent Application Publication No. 2011-170565

SUMMARY OF INVENTION

Technical Problem

Meanwhile, in warehouses that store articles, where in the warehouse, what kind of articles need to be managed so as to forward an article as efficiently as possible in response to a shipping request of the article. However, management of the placement places of articles takes effort when there are a tremendous amount of articles. Particularly, in warehouses that store many seasonable articles, the placement of articles should be changed for each season in order to improve shipping efficiency. Due to such tasks, management of the placement places of articles requires a great deal of efforts.

In the technique disclosed in PLT1, the behavior of a customer is managed using the associated data that links flow line data as the result of the customer moving around in the sales floor to the transaction data of the customer. However, there is no technique disclosed for managing the placement places of articles using flow line data of a worker who moves around in a warehouse.

The present invention has been made to solve the above-described problem, and has as an objective to provide a placement information registration device, a placement information registration method, and a placement information registration program that can easily and reliably register and manage the placement positions of objects to be managed.

Solution to Problem

A placement information registration device, as an aspect, includes
an identification information receiving unit that receives identification information that can identify an object to be managed and acquisition time of the identification information;
a position information receiving unit that receives position information relating to a position of a person who moves around in a target floor while carrying equipment configured to acquire the identification information; and
a placement information registration unit that registers the placement information of the object to be managed by registering the position information received by the position information receiving unit at the same time or almost at the same time as the acquisition time of the identification information that is received by the identification information receiving unit in association with the identification information.

A placement information registration method, as an aspect, includes
an identification information receiving step that receives identification information that can identify an object to be managed and acquisition time of the identification information;
a position information receiving step that receives position information relating to a position of a person who moves around in a target floor while carrying equipment configured to acquire the identification information; and
a placement information registration step that registers the placement information of the object to be managed by registering the position information received at the position information receiving step at the same time or almost at the same time as the acquisition time of the identification information that is received at the identification information receiving step in association with the identification information.

A placement information registration program including steps that cause a computer to execute, as an aspect, the steps:
an identification information receiving step that receives identification information that can identify an object to be managed and acquisition time of the identification information;
a position information receiving step that receives position information relating to a position of a person who moves around in a target floor while carrying equipment configured to acquire the identification information; and
a placement information registration step that registers the placement information of the object to be managed by registering the position information received at the position information receiving step at the same time or almost at the same time as the acquisition time of the identification information that is received at the identification information receiving step in association with the identification information.

Advantageous Effects of Invention

According to the present invention, registration and management of the placement positions of objects to be managed can be easily and reliably performed.

BRIEF DESCRIPTION OF DRAWINGS

FIG. 2 is a flowchart for illustrating an operation of registering the placement information of articles that are placed on racks in a warehouse; and FIG. 3 is a diagram for exemplifying the minimum functional structure of the placement information registration device according to the present invention.

DESCRIPTION OF EMBODIMENTS

Figure 1:
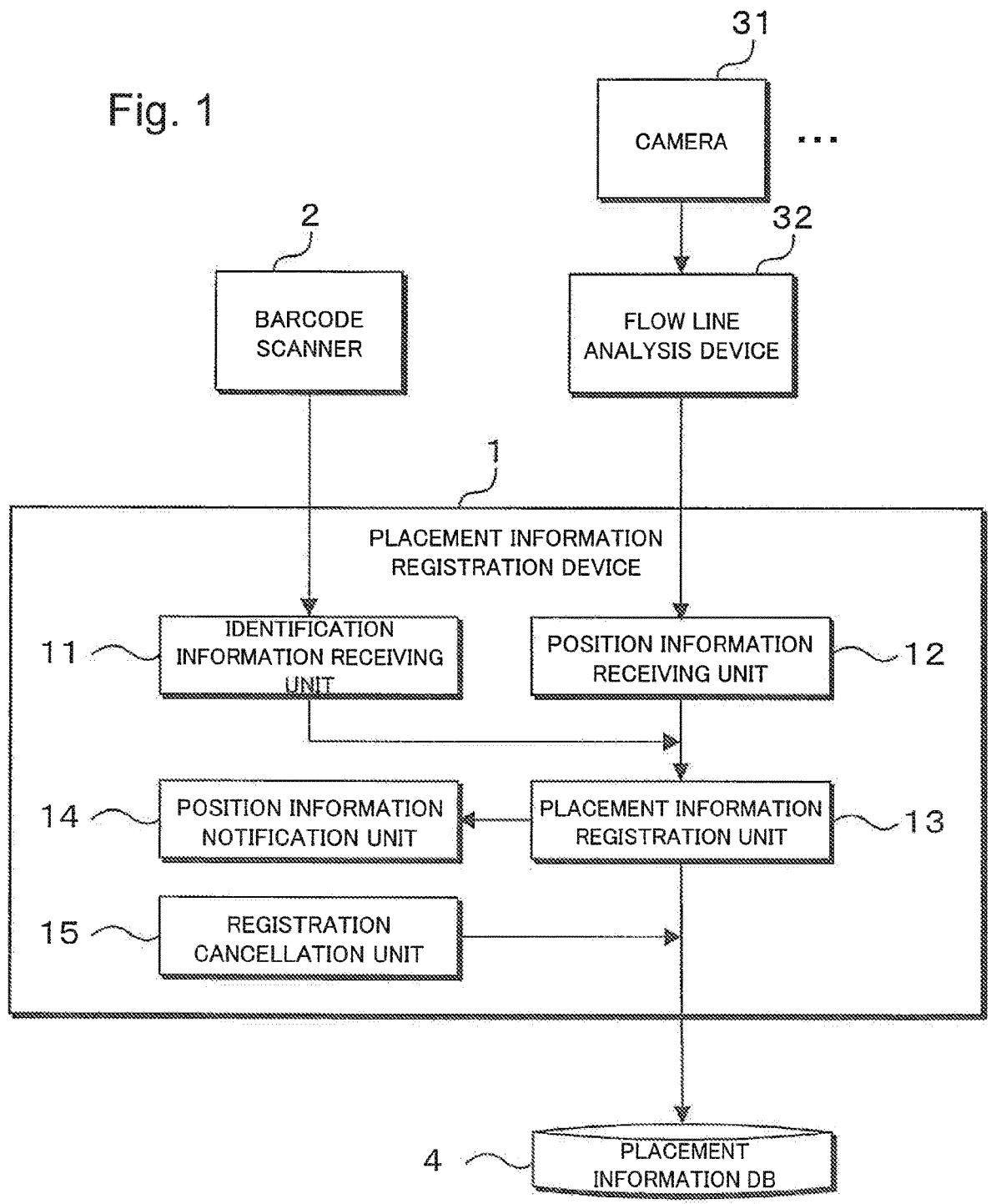
FIG. 1 is a diagram for exemplifying the functional structure of a placement information registration device according to an exemplary embodiment.

With reference to the appended drawings, the following will describe preferred exemplary embodiments of the placement information registration device, placement information registration method, and placement information registration program according to the present invention.

In the exemplary embodiment, a case of registering the placement information of articles that are placed on racks arranged in a floor of a warehouse will be described. In this example, a worker who carries a barcode scanner scans the barcodes of articles that are placed on the racks one after another. Article identification information is obtained from the barcodes. Further, by analyzing the images from a plurality of cameras disposed in the warehouse, data that represents the movement locus of the worker (hereinafter, "flow line data") is obtained. Based on the flow line data, the position information of the worker can be obtained. Then, the placement information registration device registers the placement information of articles by linking the identification information of the articles and the position information of the worker. The following will describe the exemplary embodiment further in details.

First, with reference to FIG. 1, the whole structure of the system including such a placement information registration device will be described. As shown in FIG. 1, the system includes: a barcode scanner 2 carried by a worker; a plurality of cameras 31 disposed in the warehouse; a flow line analysis device 32 that analyzes flow line data based on the images from the respective cameras 31; and a placement information registration device 1 that registers the placement information of articles placed on racks to a placement information database 4. Note that the placement information database 4 may be provided either outside the placement information registration device 1 or inside the placement information registration device 1.

The placement information registration device 1 functionally has, for example: an identification information receiving unit 11; a position information receiving unit 12; a placement information registration unit 13; a position information notification unit 14; and a registration cancellation unit 15.

Here, the placement information registration device 1 physically includes, for example: a CPU (Central Processing Unit); a storage device; and an input/output interface. The storage device includes, for example: a ROM (Read Only Memory) and a HDD (Hard Disk Drive) that store a program and data to be processed by the CPU; a RAM (Random Access Memory) that is mainly used as various work areas for control processing, and the like. These components are connected to one another through a bus. The functions of the respective units of the placement information registration device 1 are realized when the CPU executes a program stored in the ROM and processes messages received via the input/output interface, data deployed on the RAM, and the like.

The identification information receiving unit 11 receives the article identification information of the article placed upon the rack and time when the article identification information is acquired from the barcode scanner 2. Here, the article placed on the rack displays a barcode that records the article identification information that identifies the article. The worker scans the barcode of each article with the barcode scanner 2. The identification information receiving unit 11 receives the article identification information and the reading time from the barcode scanner 2 each time the barcode scanner 2 scans a barcode.

The position information receiving unit 12 receives a position coordinate of a worker that is identified based on the flow line data analyzed by the flow line analysis device 32 and time when the position is observed (hereinafter, referred to as "position time") as position information.

Here, the following will describe the procedure where the flow line analysis device 32 analyzes flow line data based on the images from the plurality of cameras 31 disposed in the warehouse. The cameras 31 capable of photographing workers who move around in the floor are installed above respective passages in the warehouse. The cameras 31 are installed at a plurality of positions so as to be able to photograph the entire area where a worker might possibly move around while the worker is checking all the articles placed on the racks.

First of all, the flow line analysis device 32 detects the presence of a person from the images photographed by the respective cameras 31. The detection is made by, for example, calculating a difference from the background image that had been captured in advance at each camera position.

Next, the flow line analysis device 32 removes the background part from the image in which the presence of a person is detected and extracts only the face part of the person's figure to generate a person's face image. Next, the flow line analysis device 32 generates a feature vector that is unique to the worker by image-processing the person's face image.

Next, the flow line analysis device 32 generates feature vector data by adding identification (ID) that identifies the feature vector, a coordinate that represents the imaging position of the feature vector (worker) (hereinafter referred to as "position coordinate"), and the imaging time of the feature vector (worker). The flow line analysis device 32 stores the feature vector data in a feature vector storing unit. The position coordinate can be calculated by, for example, allocating a corresponding coordinate to the position where the feature vector (work) is present in the coordinates on a floor map that were plotted in advance.

In particular, the flow line analysis device 32 converts the two-dimensional coordinate values on the images photographed by the cameras 31 to the coordinates on the actual floor using camera parameters that can be obtained by calibration of the cameras 31. Further, the flow line analysis device 32 can calculate the coordinate values corresponding to the floor map by converting the converted coordinates into the coordinates that are defined on the floor map.

The flow line analysis device 32, when storing the feature vector data in the feature vector storing unit, sequentially collates the feature vector of this feature vector data to be newly stored with feature vectors that have been already stored and determines whether the feature vector of the same person has been already stored. In this determination, for example, the flow line analysis device 32 calculates similarity between the collated feature vectors and, when the similarity is at a threshold or more, can determine that the feature vectors are those of the same person.

The flow line analysis device 32, when the feature vector of the same person has already been stored, generates the flow line data by associating the ID of the prestored feature vector with the position coordinate and imaging time included in the feature vector data to be newly stored. The flow line analysis device 32 stores the generated flow line data in the flow line data storing unit. On the other hand, when no feature vector of the same person has been stored, the flow line analysis device 32 recognizes the feature vector as the feature vector of a newly photographed person and stores the ID, position coordinate, and imaging time of the feature vector in the flow line data storing unit as the flow line data. In this way, the flow line analysis device 32 can accumulate position information (position coordinates and imaging time) for each ID of feature vectors.

Note that, while the flow line analysis device 32 uses a person's face image for distinguishing a worker who registers the placement information of articles, the method of distinguishing workers is not limited to this. For example, determination auxiliary means may be provided to the worker who registers the placement information of articles. The determination auxiliary means includes, for example, a cap of a specific color, a visible light tag, a flashing tablet screen, or the like, with which the worker is identifiable. In a case that a flashing tablet screen is used, an on time of the screen that repeats alternate on and off of the light is preferably the frame time of the cameras 31 or longer. Further, a worker may perform behavior that is unique to the worker within the imaging area of the cameras 31 that photograph the worker. The unique behavior may include behavior, such as, bending knees while keeping the hands up in the air or carrying a panel that is printed with a predetermined two-dimensional code above the head. In other words, the unique behavior refers to behavior that can be identified by analyzing the videos photographed by the cameras 31 using a video analysis technique. Using such the determination auxiliary means, the analysis time of the flow line data by the flow line analysis device 32 can be shortened, and the analysis accuracy can be improved.

Further, the method of distinguishing a worker can be switched depending on an angular field of the cameras 31. For example, with cameras that take enlarged faces, a person's face image may be used to identify a worker, while, with other cameras, the color of clothes, etc. may be used to identify a worker.

The placement information registration unit 13 selects the position information at the same time or almost at the same time as reading time of the article identification information that the identification information receiving unit 11 received, among the position information received by the position information receiving unit 12. The placement information registration unit 13 associates the selected position information with the article identification information that was used for selecting the position information, and registers the article identification information, to which the position information is associated, in the placement information database 4. In other words, the placement information registration unit 13 registers the placement information of the articles placed on the racks.

The position information notification unit 14 notifies the position information registered by the placement information registration unit 13 to the worker. As a method of notifying to the worker, any method can be used as long as information for determining the position to be registered can be conveyed to the worker, such as by a sound (including a voice) and a message (including a text, a symbol, and an illustration). Further, lights may be provide at positions of the racks where articles will be placed, and the lights corresponding to the positions to be registered may either be turned on or flash.

When a registration cancellation request of the placement information is issued based on an operation instruction of the worker, the registration cancellation unit 15 cancels the registration corresponding to the placement information for which the cancellation is requested in the placement information database 4. The worker can issue a registration cancellation request of the placement information when the worker determines that the position information notified by the position information notification unit 14 is wrong. Means that issues a registration cancellation request may be provided on the barcode scanner 2 or other equipment. Further, after canceling the registration, the worker may again perform a task of scanning the barcode by the barcode scanner 2.

With reference to FIG. 2, the following will describe an operation of registering the placement information of articles placed on racks in the warehouse. This operation is performed each time a worker who carries the barcode scanner 2 scans the barcode of an article placed on a rack.

First of all, when the barcode is scanned by the barcode scanner 2 (step S101), the identification information receiving unit 11 of the placement information registration device 1 receives the article identification information and the reading time from the barcode scanner 2 (step S102).

Next, the placement information registration unit 13 of the placement information registration device 1 selects the position information at the same time or almost at the same time as the reading time of the article identification information received at step S102 among the position information that the position information receiving unit 12 received from the flow line analysis device 32 (step S103).

Next, the placement information registration unit 13 associates the position information selected at step S103 with the article identification information that was used for selecting the position information and registers the article identification information, to which the position information is associated, in the placement information database 4 (step S104).

Next, the position information notification unit 14 of the placement information registration device 1 notifies the position information being registered at step S104 to the worker (step S105). This ends the registration operation.

As described above, in the case of the placement information registration device 1 in this exemplary embodiment, the identification information receiving unit 11 receives the article identification information of articles placed on racks and the reading time from the barcode scanner 2. Further, the identification information receiving unit 11 receives the position information of the worker who moves around in the floor while carrying the barcode scanner 2 from the flow line analysis device 32. Then, the placement information registration unit 13 selects the position information at the same time or almost at the same time as the reading time of the article identification information among the position information received from the flow line analysis device 32. Further, the placement information registration unit 13 associates the selected position information with the article identification information that was used for selecting the position information and registers the article identification information, to which the position information is associated, in the placement information database 4.

As such, the placement information registration device 1 in the exemplary embodiment can easily and reliably register and manage the placement places of articles as objects to be managed.

Further, since the position information notification unit 14 can notify the position information to be registered to the worker, the worker can confirm whether or not the article scanned by the barcode scanner 2 is going to be registered at an accurate position. Further, in a case that the article is to be registered with a wrong place, the worker can issue a registration cancellation request of the placement information, whereby the registration cancellation unit 15 that received the request can cancel the registration corresponding to the placement information, to which the cancellation is requested, in the placement information database 4.

[Variables]

Note that the above-described exemplary embodiment is only an example, and it is not intended to eliminate variations and adaptation of other techniques that are not clearly described in the exemplary embodiment. That is, the present invention can be implemented in various exemplary embodiments in a scope not departing from the spirit thereof.

For example, while the barcode scanner 2 is used in the above-described exemplary embodiment as means for transmitting the article identification information to the placement information registration device 1, the means for transmitting the article identification information is not limited to the barcode scanner 2. For example, the means for transmitting the article identification information may include RFID (Radio Frequency Identification), a sound recognition terminal such as a microphone, an image recognition terminal, or a camera.

If RFID is used as the means for transmitting the article identification information, for example, RFID tags in which the article identification information is written are attached to the articles placed on the racks. Then, transmission of the article identification information to the placement information registration device 1 can be realized by having a worker carry an RFID reader. In this case, each time the RFID reader reads the article identification information from an RFID tag, the RFID reader may transmit the article identification information and the reading time thereof to the placement information registration device 1.

If the sound recognition terminal, such as a microphone, is used as the means for transmitting the article identification information, for example, the article identification information is displayed on the articles placed on the racks. Then, transmission of the article identification information to the placement information registration device 1 can be realized by having a worker carry the sound recognition terminal such as a microphone. That is, each time the worker reads out the article identification information, the sound recognition terminal such as a microphone may convert the collected sound to a text string and transmit the article identification information corresponding to the text string and the sound collection time to the placement information registration device 1.

If the image recognition terminal is used as the means for the transmitting article identification information, for example, the article identification information is displayed on the articles placed on the racks. Transmission of the article identification information to the placement information registration device 1 can be realized by having a worker carry the image recognition terminal. In such a case, each time photographing an article, the image recognition terminal may recognize the article identification information from the photographed image and transmit the article identification information and the imaging time to the placement information registration device 1.

If the camera is used as the means for transmitting the article identification information, for example, the means can be realized by having a worker carry the camera. In such a case, each time the camera photographs an article, the camera may transmit the photographed image and the imaging time as information representing the work done to the placement information registration device 1. In the case of using such a camera, the present invention can be applied, for example, to the check of a maintenance/repair of objects including buildings, trains, and machines. In particular, for example, in a case that the present invention is applied to an auto assembly site, a photograph of the left front tire of a specific car is registered in association with the then position information of the photographer. As such, when the bolt of the left front tire of the specific car is checked for its tightness, the work area can be promptly identified.

Further, while, in the above-described exemplary embodiment, the flow line analysis device 32 is used based on the images from cameras 31 as means for transmitting the position information to the placement information registration device 1, the means for transmitting the position information is not limited to the flow line analysis device 32 based on images. For example, a flow line analysis device based on RFID, a wireless base station, or a vibration sensor such as a microphone, or a camera that is disconnected from a flow line analysis device may instead be used.

If the flow line analysis device based on RFID is used as means for transmitting the position information, for example, active tags are installed at not less than three points in the floor, and an RFID reader is carried by a worker. Then, the means for transmitting the position information can be realized using the active tags, RFID reader, and coordinates defined on the floor map. In such a case, the flow line analysis device identifies the position coordinate of the worker by an operation, such as, calculating a distance between the reader and each active tag based on the strength of the received signals that the RFID reader receives from each active tag. In the case of calculating the distance, the principle of triangulation may be used. In the case that the position coordinate of the worker is identified, the flow line analysis device stores the reader ID, the position coordinate, and time when identifying the position coordinate in the flow line data storing unit as the flow line data. As such, the position information (the position coordinate and the identified time) can be accumulated in the same way as the flow line analysis device 32 based on images of the above-described exemplary embodiment. The flow line analysis device based on RFID may transmit this position information to the placement information registration device 1.

Likewise, the means for transmitting the position information can also be realized by installing the RFID readers at not less than three points in the floor and having a worker carry the active tag.

If the camera disconnected from the flow line analysis device is used as means for transmitting the position information, for example, one or a plurality of cameras are disposed in the warehouse, and the positions within the imaging area of each camera are associated in advance with corresponding rack numbers and shelf numbers of the racks. As such, means for transmitting the position information can be implemented. In such a case, the cameras may transmit the rack number corresponding to the position where the worker is photographed and the imaging time as the position information to the placement information registration device 1.

If the flow line analysis device based on a wireless base station is used as means for transmitting the position information, for example, a wireless LAN (Local Area Network) base station is installed within a warehouse and a worker carries a wireless terminal. Using such the base station, a wireless terminal, and coordinates defined on the floor map, the means for transmitting the position information can be realized. In such a case, the base station that receives signals sent from the wireless terminal identifies the position coordinate of the worker who carries the wireless terminal by an operation, such as calculating the distance from the transmission source based on the received strength (the frequency strength of the electric wave). Then, the base station may transmit the identified position coordinate of the worker together with the received time of signals as the position information to the placement information registration device 1.

If the flow line analysis device based on the vibration sensor such as a microphone is used as means for transmitting the position information, for example, the means for transmitting the position information can be realized by installing a plurality of vibration sensors such as microphones in a warehouse and using the coordinates defined on the floor map. In such a case, the vibration sensors such as microphones that collect operation sounds of the barcode scanner 2, footsteps of the worker, and the like identify the position coordinate of the worker by an operation, such as calculating a distance from the sound source based on the frequency strength of sound waves. Then, the vibration sensors may transmit the identified position coordinates together with the sound collection time to the placement information registration device 1. To calculate the distance from a sound source, sounds collected by the plurality of vibration sensors such as microphones may be used to calculate the distance to the sound source based on the principle of triangulation.

Further, in the above-described exemplary embodiment, the flow line analysis device 32 includes the function of identifying a worker who registers the placement information of articles. The method of identifying a worker who registers the placement information of articles is preferably easily done using the function of the flow line analysis device 32. In particular, for example, in a case that the flow line analysis device using vibration sensors such as microphones is used, the worker may work with a bell of a pitch that is unique to the worker or the worker may utter a sound command that is unique to the worker before starting a work. Further, if the worker performs a registration task while carrying an RFID active tag, for example, the identification information is assigned to the active tag. Then, associated data that associates the identification information of the active tag with the identification information of the worker who carries the active tag is registered in advance. In this way, the active tag can be distinguished from other active tags (workers) used in the floor.

In the above-described exemplary embodiment, the placement information is registered each time the barcode is scanned. Alternatively, a mode for registering the placement information and a mode for not registering the placement information may be provided so as to distinguish whether or not the barcode scanning task is the task for registering the placement information. In the mode of registering the placement information, the barcode scanner 2 may transmit a registration mode start/end command to the placement information registration device 1.

Further, the position coordinates as the position information in the above-described exemplary embodiment may be two-dimensional coordinates or three-dimensional coordinates. In the case of two-dimensional coordinates, the floor surface of the warehouse is defined as a two-dimensional coordinate surface. Whereas, in the case of three-dimensional coordinates, three-dimensional coordinates are represented by adding the coordinates in the height direction that is perpendicular to the floor surface to the two-dimensional coordinates formed by the floor surface. Positions in the height direction can be identified based on the position of an arm of or the posture (e.g., standing upright, half sitting, knee-bend) of the worker photographed by the cameras 31.

If it is difficult to identify positions in the height direction, height direction measurement means may further be equipped. The height direction measurement means, for example, includes an acceleration sensor. In such a case, the acceleration sensor is attached to an arm and the like of the worker. Then, the coordinates of the height direction can be identified according to the behavior of the worker raising and lowering the arm. Alternatively, a plurality of distance sensors may be installed on the ceiling and the like of the warehouse, and coordinates in the height direction may be identified according to the distance to the worker that is measured by the distance sensors.

Further, height direction input means for inputting a shelf of a rack where an article is placed may further be equipped. The height direction input means, for example, includes a microphone, a barcode scanner, or the like. In the case that the microphone is used, a worker may utter the shelf where the article is placed. In the case that the barcode reader is used, barcodes that record the respective shelf numbers may be prepared, and the barcode corresponding to the shelf number where the article is placed may be scanned by the barcode scanner.

Alternatively, the position information including the height direction may be identified using rule information that standardizes a behavior procedure of a person. For example, if the rule information that denotes sequential scanning of the upper shelf, middle shelf, and lower shelf of the rack at the same place is set, the article identification information that is received three times in a row with the same position information is registered after being calibrated to the position information corresponding to the upper shelf, middle shelf, and lower shelf of the rack, instead of being registered in association with the same position information as the placement information. The rule information can be set in relation not only to the height direction of the racks but also to the lateral direction thereof.

In particular, by following a rule that denotes sequential scanning of the left side, center, right side of the top shelf, then, the left side, center, right side of the second shelf, not only the shelf of a cabinet but also the whereabout in a certain shelf of a cabinet can be set.

Further, setting a rule of the order of racks as scanning objects in the floor, this rule information can be used to improve the accuracy of registration of position information. For example, suppose there is a floor where four rows of racks, A row, B row, C row, and D row, are arranged. The racks of A row and the racks of B row are arranged to oppose each other with a first passage inbetween. The racks of C row and the racks of D row are sequentially arranged with a second passage inbetween. The racks of B row and the racks of C row are arranged back to back. In this floor, racks A1, A2, A3 are sequentially arranged from the front in A row; likewise, racks B1, B2, B3, racks C1, C2, C3, and racks D1, D2, D3 are respectively sequentially arranged from the front in B row, C row, and D row. In such a case, a rule for sequentially scanning in the order of A1-A2-A3-B1-B2-B3-

C1-C2-C3-D1-D2-D3 is set. By following this rule, the placement information can be registered in higher accuracy even when it is difficult to determine whether a cabinet of A row or a cabinet of B row is scanned only from the acquired position information due to the narrowness of the passage.

Further, in the above-described exemplary embodiment, the placement information registration unit 13 selects the position information at the same time or almost at the same time as the reading time of the article identification information that the identification information receiving unit 11 received, among the position information received by the position information receiving unit 12. However, this function of selecting the position information is not an essential component of the present invention. Selection of the position information can be omitted as in the following processing. For example, in a case that the position information can be received at the same time or almost at the same time as time when the article identification information is acquired, the identification information receiving unit 11, upon receiving the article identification information, may generate the placement information of an article using the latest position information that the position information receiving unit 12 received and register the placement information of the article.

Further, in the above-described exemplary embodiment, the article identification information and the reading time that are received from the barcode scanner 2 and the position information received from the flow line analysis device 32 are sequentially processed on real time basis. Alternatively, those information may be accumulated in database, and, for example, may be collectively registered as the placement information later by batch processing or the like. In such a case, the article identification information received by the identification information receiving unit 11 is registered in the identification information database in association with the acquisition time of this article identification information, and the position information received by the position information receiving unit 12 (position coordinate and position time) is registered in the position information database. Then, the placement information registration unit 13 may register the placement information of an article placed on a rack, by selecting the position information corresponding to the position time at the same time or almost at the same time as the acquisition time corresponding to any one piece of the article identification information registered in the identification information database among the position information that is registered in the position information database.

Further, while the placement information registration device in the above-described exemplary embodiment has respective units shown in FIG. 1 as functional components, the functional components of the placement information registration device according to the present invention are not limited to this. With reference to FIG. 3, the minimum functional components of the present invention will be described. The placement information registration device 1 shown in FIG. 3 has the functional components that the placement information registration device 1 shown in FIG. 1 has except for the position information notification unit 14 and registration cancellation unit 15. The other functional components will not be described, as the other functional components are the same as those of the placement information registration device 1 shown in FIG. 1.

Further, while, in the above-described exemplary embodiment, articles placed on racks are used to describe registration objects for registering the placement information, registration objects are not limited to articles placed on racks. For example, registration objects may include racks, shelves of racks, or passages of a floor. In such a case, rack identification information for identifying racks, shelf identification information for identifying shelves of racks, passage identification information for identifying passages of a floor may be received from the barcode scanner 2.

A part of or a whole of the above-described exemplary embodiment can be described as in the following Supplementary Notes without limiting the present invention to the following.

(Supplementary Note 1)

A placement information registration device comprising:

an identification information receiving unit that receives identification information that can identify an object to be managed and acquisition time of the identification information;

a position information receiving unit that receives position information relating to a position of a person who moves around in a target floor while carrying equipment configured to acquire the identification information; and a placement information registration unit that registers the placement information of the object to be managed by registering the position information received by the position information receiving unit at the same time or almost at the same time as the acquisition time of the identification information that is received by the identification information receiving unit in association with the identification information.

(Supplementary Note 2)

The placement information registration device according to Supplementary Note 1, wherein the placement information registration unit selects the position information at the same time or almost at the same time as the acquisition time of the identification information that is received by the identification information receiving unit among the position information that is received by the position information receiving unit and registers the selected position information in association with the identification information that is used when selecting the position information.

(Supplementary Note 3)

The placement information registration device according to Supplementary Note 1 or 2, wherein the placement information registration unit registers the placement information of the object to be managed after calibrating the position information using rule information that standardizes an operation procedure of the person.

(Supplementary Note 4)

The placement information registration device according to any one of Supplementary Notes 1 to 3, further comprising: a position information notification unit that notifies the position information that is registered by the placement information registration unit.

(Supplementary Note 5)

The placement information registration device according to any one of Supplementary Notes 1 to 4, further comprising: a registration cancellation unit that cancels registration of the placement information when a registration cancellation request of the placement information is issued by an operation instruction of the person.

(Supplementary Note 6)

The placement information registration device according to any one of Supplementary Notes 1 to 5, wherein the position information is the position information of a person who is identified using a feature that can distinguish the person who moves around in the target floor.

(Supplementary Note 7)

A placement information registration method comprising:

an identification information receiving step that receives identification information that can identify an object to be managed and acquisition time of the identification information;

a position information receiving step that receives position information relating to a position of a person who moves around in a target floor while carrying equipment configured to acquire the identification information; and a placement information registration step that registers the placement information of the object to be managed by registering the position information received at the position information receiving step at the same time or almost at the same time as the acquisition time of the identification information that is received at the identification information receiving step in association with the identification information.

(Supplementary Note 8)

The placement information registration method according to Supplementary Note 7, wherein, in the placement information registration step, selecting the position information at the same time or almost at the same time as the acquisition time of the identification information that is received at the identification information receiving step among the position information that is received at the position information receiving step, and registering the selected position information in association with the identification information that is used when selecting the position information.

(Supplementary Note 9)

The placement information registration method according to Supplementary Note 7 or 8, wherein, in the placement information registration step, registering the placement information of the object to be managed after calibrating the position information using rule information that standardizes an operation procedure of the person.

(Supplementary Note 10)

The placement information registration method according to any one of Supplementary Notes 7 to 9, further comprising: a position information notification step that notifies the position information that is registered at the placement information registration step.

(Supplementary Note 11)

The placement information registration method according to any one of Supplementary Notes 7 to 10, further comprising: a registration cancellation step that cancels registration of the placement information in a case that a registration cancellation request of the placement information is issued by an operation instruction of the person.

(Supplementary Note 12)

The placement information registration method according to any one of Supplementary Notes 7 to 11, wherein the position information is the position information of a person who is identified using a feature that can distinguish the person who moves around in the target floor.

(Supplementary Note 13)

A placement information registration program including steps that cause a computer to execute, the steps:

an identification information receiving step that receives identification information that can identify an object to be managed and acquisition time of the identification information;

a position information receiving step that receives position information relating to a position of a person who moves around in a target floor while carrying equipment configured to acquire the identification information; and a placement information registration step that registers the placement information of the object to be managed by registering the position information received at the position information receiving step at the same time or almost at the same time as the acquisition time of the identification information that is received at the identification information receiving step in association with the identification information.

(Supplementary Note 14)

The placement information registration program according to Supplementary Note 13, wherein, in the placement information registration step, selecting the position information at the same time or almost at the same time as the acquisition time of the identification information that is received at the identification information receiving step among the position information that is received at the position information receiving step, and registering the selected position information in association with the identification information that is used when selecting the position information.

(Supplementary Note 15)

The placement information registration program according to Supplementary Note 13 or 14, wherein, in the placement information registration step, registering the placement information of the object to be managed after calibrating the position information using rule information that standardizes an operation procedure of the person.

(Supplementary Note 16)

The placement information registration program according to any one of Supplementary Notes 13 to 15, the step further including: a position information notification step that notifies the position information that is registered at the placement information registration step.

(Supplementary Note 17)

The placement information registration program according to any one of Supplementary Notes 13 to 16, the step further including: a registration cancellation step that cancels registration of the placement information in a case that a registration cancellation request of the placement information is issued by an operation instruction of the person.

(Supplementary Note 18)

The placement information registration program according to any one of Supplementary Notes 13 to 17, wherein the position information is the position information of a person who is identified using a feature that can distinguish the person who moves around in the target floor.

This application is based upon and claims the benefit of priority from Japanese patent application No. 2012-173984, filed on Aug. 6, 2012, the disclosure of which is incorporated herein in its entirety by reference.

While the invention has been particularly shown and described with reference to preferred exemplary embodiments thereof, the invention is not limited to these exemplary embodiments. It will be understood by those of ordinary skill in the art that various changes in form and details may be made therein without departing from the spirit and scope of the present invention as defined by the claims.

INDUSTRIAL APPLICABILITY

The placement information registration device, placement information registration method, and placement information registration program according to the present invention is suitable for easily and reliably registering and managing the placement places of objects to be managed.

REFERENCE SIGNS LIST 1, 1s placement information registration device
2 barcode scanner 4 placement information database
11 identification information receiving unit
12 position information receiving unit
13 placement information registration unit
14 position information notification unit
15 registration cancellation unit
31 camera
32 flow line analysis device

The invention claimed is:

1. A placement information registration device comprising:
   a memory storing instructions; and
   a processor configured to execute the instructions to:
      receive, via a communication network, identification information of an object to be managed and a first acquisition time of the identification information, from a mobile terminal carried by a person who moves around on a target floor while carrying the object;
      receive person position information relating to a position of the person while carrying the object and a second acquisition time corresponding to the person position information, the person position information being determined based on image data captured by a stationary camera located on the target floor;
      calibrate the person position information to position information relating to a shelf of a rack on the target floor by using the image data captured by the stationary camera;
      analyze person position information by matching the first acquisition time and the second acquisition time;
      select the person position information received at the second acquisition time which is the same time or at substantially the same time as the first acquisition time of the identification information among person position information that is received; and
      register the analyzed person position information in association with the identification information to indicate a placement position of the object.

2. The placement information registration device according to claim 1, wherein the processor is further configured to execute the instructions to:
   register the person position information after calibrating the received person position information using rule information that standardizes an operation procedure of the person, the rule information indicating a scan order of shelves.

3. The placement information registration device according to claim 1, wherein the processor is further configured to execute the instructions to:
   send, via the communication network, a notification of the registered person position information to a user device of the person.

4. The placement information registration device according to claim 1, wherein the processor is further configured to execute the instructions to:
   cancel registration of the person position information upon issuance of a registration cancellation request of the person position information based on an operation instruction of the person.

5. The placement information registration device according to claim 1, wherein the person is identified using a feature that distinguishes the person.

6. A placement information registration method implemented by a processor executing instructions stored in a memory, the method comprising:
   receiving, via the processor and a communication network, identification information of an object to be managed and a first acquisition time of the identification information, from a mobile terminal carried by a person who moves around on a target floor while carrying the object;
   receiving, via the processor, person position information relating to a position of the person while carrying the object and a second acquisition time corresponding to the person position information, the person position information being determined based on image data captured by a stationary camera located on the target floor;
   calibrating, via the processor, the person position information to position information relating to a shelf of a rack on the target floor by using the image data captured by the stationary camera;
   analyzing, via the processor, person position information by matching the first acquisition time and the second acquisition time;
   selecting, via the processor, the person position information received at the second acquisition time which is the same time or at substantially the same time as the first acquisition time of the identification information among person position information that is received; and
   registering, via the processor, the analyzed person position information in association with the identification information to indicate a placement position of the object.

7. A placement information registration device comprising:
   a memory storing instructions; and
   a processor configured to execute the instructions to:
      receive, via a communication network, identification information of an object to be managed and a first acquisition time of the identification information, from a mobile terminal carried by a person who moves around on a target floor while carrying the object;
      receive person position information relating to a position of the person who moves around on a target floor while carrying the object and a second acquisition time corresponding to the person position information, the person position information being detected using image data captured by a camera;
      calibrate the person position information to position information relating to a shelf of a rack by using the image data captured by the camera;
      analyze person position information by matching the first acquisition time and the second acquisition time;
      register the analyzed person position information in association with the identification information to indicate a placement position of the object;
      send, via the communication network, a notification of the registered person position information to a user device of the person; and
      select the person position information received at the second acquisition time which is the same time or at substantially the same time as the first acquisition time of the identification information among person position information that is received.

8. The placement information registration device according to claim 7, wherein the processor is further configured to execute the instructions to:
   register the person position information after calibrating the received person position information using rule information that standardizes an operation procedure of the person, the rule information indicating a scan order of shelves.

9. The placement information registration device according to claim 7, wherein the processor is further configured to execute the instructions to:
cancel registration of the person position information upon issuance of a registration cancellation request of the person position information based on an operation instruction of the person.

10. The placement information registration device according to claim 7, wherein the person is identified using a feature that distinguishes the person.

11. A placement information registration method implemented by a processor executing instructions stored in a memory, the method comprising:
receiving, via the processor and a communication network, identification information of an object to be managed and a first acquisition time of the identification information, from a mobile terminal carried by a person who moves around on a target floor while carrying the object;
receiving, via the processor, person position information relating to a position of the person while carrying the object and a second acquisition time corresponding to the person position information, the person position information being determined based on image data captured by a stationary camera located on the target floor;
calibrating, via the processor, the person position information to position information relating to a shelf of a rack on the target floor by using the image data captured by the stationary camera;
analyzing, via the processor, person position information by matching the first acquisition time and the second acquisition time;
registering, via the processor, the analyzed person position information in association with the identification information to indicate a placement position of the object;
sending, via the processor and the communication network, a notification of the registered person position information to a user device of the person; and
selecting the person position information received at the second acquisition time which is the same time or at substantially the same time as the first acquisition time of the identification information among person position information that is received.

12. A non-transitory computer readable medium storing a program for causing a computer to execute a placement information registration method, the method comprising:
receiving, via a communication network, identification information of an object to be managed and a first acquisition time of the identification information, from a mobile terminal carried by a person who moves around on a target floor while carrying the object;
receiving person position information relating to a position of the person while carrying the object and a second acquisition time corresponding to the person position information, the person position information being determined based on image data captured by a stationary camera located on the target floor;
calibrating the person position information to position information relating to a shelf of a rack on the target floor by using the image data captured by the stationary camera;
analyzing person position information by matching the first acquisition time and the second acquisition time;
selecting the person position information received at the second acquisition time which is the same time or at substantially the same time as the first acquisition time of the identification information among person position information that is received; and
registering the analyzed person position information in association with the identification information to indicate a placement position of the object.

13. A non-transitory computer readable medium storing a program for causing a computer to execute a placement information registration method, the method comprising:
receiving, via a communication network, identification information of an object to be managed and a first acquisition time of the identification information, from a mobile terminal carried by a person who moves around on a target floor while carrying the object;
receiving person position information relating to a position of the person while carrying the object and a second acquisition time corresponding to the person position information, the person position information being determined based on image data captured by a stationary camera located on the target floor;
calibrating the person position information to position information relating to a shelf of a rack on the target floor by using the image data captured by the stationary camera;
analyzing person position information by matching the first acquisition time and the second acquisition time;
registering the analyzed person position information in association with the identification information to indicate a placement position of the object; and
sending, via the communication network, a notification of the registered person position information to a user device of the person; and
selecting the person position information received at the second acquisition time which is the same time or at substantially the same time as the first acquisition time of the identification information among person position information that is received.

* * * * *